(12) United States Patent
Ke

(10) Patent No.: US 7,123,476 B2
(45) Date of Patent: Oct. 17, 2006

(54) EXTENDING BASE FOR PORTABLE COMPUTER

(75) Inventor: Billy Ke, Taipei (TW)

(73) Assignee: Arima Computer Corporation, Taipei (TW)

( * ) Notice: Subject to any disclaimer, the term of this patent is extended or adjusted under 35 U.S.C. 154(b) by 0 days.

(21) Appl. No.: 10/784,390

(22) Filed: Feb. 23, 2004

(65) Prior Publication Data

US 2005/0184210 A1 Aug. 25, 2005

(51) Int. Cl.
*H05K 7/00* (2006.01)
*H01R 13/62* (2006.01)

(52) U.S. Cl. .............. 361/686; 361/683; 248/346.01; 248/918; 715/700; 439/152

(58) Field of Classification Search ........... 248/346.01, 248/918; 439/152, 137, 145; 361/686, 683, 361/687
See application file for complete search history.

(56) References Cited

U.S. PATENT DOCUMENTS 6,061,234 A * 5/2000 Broder et al. ............... 361/686
6,123,557 A * 9/2000 Wang et al. ................. 439/137
6,191,943 B1 * 2/2001 Tracy ......................... 361/687
6,264,484 B1 * 7/2001 Chien et al. ................ 439/152
6,362,959 B1 * 3/2002 Tracy ......................... 361/687
6,760,217 B1 * 7/2004 Tsai ............................ 361/683
6,813,145 B1 * 11/2004 DeLuga ...................... 361/679

* cited by examiner

*Primary Examiner*—Anita M. King
(74) *Attorney, Agent, or Firm*—Volpe & Koenig, P.C.

(57) ABSTRACT

An extending base for a portable computer is provided. The extending base includes: a base body, an electrical connector fixedly mounted on the base body for being electrically connected with the portable computer, a detachable cover covering the base body for supporting the portable computer, wherein the electrical connector is protrudent out of the detachable cover, a plurality of first engaging elements mounted on the detachable cover, a sliding structure mounted on the base body for sliding along a direction in response to an external force, and a plurality of second engaging elements mounted on the sliding structure for engaging with the first engaging elements so as to fix the detachable cover on the base body.

16 Claims, 7 Drawing Sheets

EXTENDING BASE FOR PORTABLE COMPUTER

FIELD OF THE INVENTION

The present invention is related to an extending base, and more particularly, to an extending base for a portable computer.

BACKGROUND OF THE INVENTION

Nowadays, computers have become necessary equipments for individuals in daily life. For those people who need powerful computers, desktop computer would be the best choice, since the desktop computer is superior than most of other types of computer in many ways, including functions, extending capability, displaying quality, operating convenience, and costs. However, the computers with mobile feature are more and more required for users in different fields in modern society, which results in the demanding trend for portable computers. In the future, even though the computer will be developed into all kinds of appearances, shapes, and sizes, it is believed that computers will continuously follow the trend of portability, thin and small size, and light-weight.

However, some people find that it is difficult or uncomfortable to use a laptop at their desks. The screen may be too small to see adequately. The keyboard may be slightly smaller than a standard keyboard. The touch pad may not be as comfortable to use as a mouse. And, the users often want to have access to more than one type of disk drive. Furthermore, in the present design for the portable computer, the serial ports are not designed as adequate and complete as that of the desktop computer. Besides, the present portable computer mostly utilizes universal serial bus instead of the traditional parallel port or the serial port. Nevertheless, many common computer peripheral equipments are still using parallel port or the serial port, such as a display, a printer, a modem, a keyboard, and a mouse. Therefore, in order to make the laptop more convenient for desktop use, an extending base is developed so that the portable computer can be connected with the peripheral equipments through it.

On the other hand, for those people who are sales or mostly work outside the office, an extending base is favorable and convenient equipment. The portable computer is light and handy for use outside the office, but would be capable of becoming a powerful computer with all functions in the office by being connected with an extending base. The main feature of an extending base is the multiple ports for connecting with peripheral equipments. The common extending base has several peripheral devices (full-size computer monitor, full-size keyboard, mouse, printer) connected to it, which is also called port replicator. Another type of extending base is called docking station, besides the forgoing peripheral devices, which further includes disk drives, hard disc, and network interface. The docking station has a bigger size and better extending capability to provide better functions.

A good extending base not only provides powerful extending functions and complete extending flexibility, but also avoids the inconvenience of plugging in and pulling out the peripheral devices. The user can plug the peripheral devices into the extending base for long-term, such as mouse, printer, or scanner, and leave the office or home with the portable computer only. When returning to the working place, the user can simply plug the laptop into the extending station to use it as a desktop computer. In other words, the user makes one connection to the laptop instead of many. Hence, the extending base not only avoids the trouble of repeatedly plugging in the peripheral devices, but also satisfies the extending needs of the portable computer which might not be as powerful as a desktop.

However, the extending base in the market right now is designed to specific sizes for the particular laptops. That is, the portable computer with different standards and sizes can only make connection with the extending base with the particular size matched therewith. Please refer to FIG. 1 which is a diagram illustrating the traditional extending base according to the prior art. The conventional extending base includes the base body 10, the electrical connector 11, and the upper cover 12. The electrical connector 11 is fixedly mounted on the base body 10 for being electrically connected with the portable computer (not shown). The upper cover 12 covers the base body 10 and supports the portable computer. Generally, there are two guiding elements 122 mounted on the upper cover 12. The sizes of the base body 10 and the upper cover 12, and the position of the guiding elements 122 are specifically designed according to the size of the matching laptop. Therefore, the user can move the portable computer along the position of the guiding elements 122. When the computer is at the position just right surrounded by the guiding elements 122, it can be fixed at the fixed position, and the electrical connector 11 on the base body 10 can be connected with the electrical connector of the computer (not shown). However, since the standard of the extending base and the position of the guiding elements 122 are decided by the portable computer, the user would have to replace the extending base for different portable computers, which is very impractical and inconvenient. Besides, when the user changes a new portable computer, he often has to buy a new extending base for the particular computer as well, due to that the original extending base is usually not compatible with the new computer because of the different standards. In such a way, the higher and unnecessary cost for the user is imaginable.

In addition, the screws 15 are used for fixing the upper cover 12 on the base body 10 when assembling the upper cover 12 and the base body 10 of the traditional extending base. Please refer to FIG. 1. The plural screws 15 under the bottom of the base body 10 are screwed upward and passed through the upper cover 12 so that the upper cover 12 is tightly screwed on the base body 10. However, this kind of assembly process not only lengthens the assembly time, but also makes the disassembly of the upper cover 12 very troublesome. When assembling the upper cover 12 and the base body 10, the assembly process is completed by firstly covering the upper cover 12 on the base body 10 and then screwing the upper cover 12 on the base body 10, which takes too much time. Besides, the plural screws 15 would cost part of the expenditure for the industry as well. On the other hand, when the upper cover 12 needs to be disassembled from the base body 10 for repairing, a screwdriver is needed to unscrew the plural screws 15 for opening the upper cover 12. After the repairing is finished, the plural screws 15 have to be screwed back, which costs too much time and manpower and increases the repair costs.

From the above description, it is known that how to develop an extending base for the industry, which fits all portable computers with different standards and sizes, has become a major problem waited to be solved. In order to overcome the drawbacks in the prior art, an extending base for a portable computer is provided in the invention. The particular design not only solves the problem that every computer needs one particular extending base, but also simplifies the assembly process for the extending base. The assembly process is easy and economical to be executed, which can significantly save time and manpower. Thus, the invention has the utility for the industry.

SUMMARY OF THE INVENTION

The main purpose of the present invention is to provide an extending base for a portable computer, which can be adapted to different kinds of portable computers with different standards and sizes so that the user will not have to replace the extending base for each computer.

It is one object of the present invention to provide an extending base which has several changeable upper covers for the base body. The upper cover is detachable from the base body and can be changed according to the size or standards of the portable computer.

It is another object of the present invention to provide an extending base for a portable computer, which is assembled by an easier and convenient process without the need of screwdriver and screws when assembling the base body and the upper cover.

It is another object of the present invention to provide an extending base for a portable computer, which is assembled by directly engaging the base body and the upper cover. When an external force is applied to the sliding structure of the extending base, the upper cover can be detached from the base body. Therefore, the upper cover can be changed in a short time for different kinds of portable computer with different standards and sizes.

According to one aspect of the present invention, an extending base for a portable computer, includes: a base body, an electrical connector fixedly mounted on the base body for being electrically connected with the portable computer, a detachable cover covering the base body for supporting the portable computer, wherein the electrical connector is protrudent out of the detachable cover, a plurality of first engaging elements mounted on the detachable cover, a sliding structure mounted on the base body for sliding along a direction in response to an external force, and a plurality of second engaging elements mounted on the sliding structure for engaging with the first engaging elements so as to fix the detachable cover on the base body.

In accordance with the present invention, the extending base further includes a latch connected with the sliding structure and protrudent out of the detachable cover for accepting the external force.

Preferably, when the latch accepts the external force which impels the sliding structure to slide along the direction, the first engaging elements and the second engaging elements are disengaged from each other so as to detach the detachable cover from the base body.

Preferably, the extending base further includes an ejecting element mounted on the base body and protrudent out of the detachable cover.

Preferably, the ejecting element is connected with an elastic structure for ejecting the portable computer out of the extending base by an elasticity of the elastic structure so as to separate the portable computer from the extending base.

Preferably, the sliding structure is connected with an elastic element mounted on the base body so as to automatically slide back to a recovery position by an elasticity of the elastic element after the external force disappears.

Preferably, the sliding structure and the plurality of second engaging elements are formed integrally.

Preferably, the detachable cover further includes two guiding elements respectively mounted at two upper corners of the detachable cover for guiding the portable computer to a fixed position.

Preferably, the detachable cover further includes a guiding block mounted at an upside of the detachable cover for further guiding the portable computer to the fixed position.

Preferably, the portable computer is guided to the fixed position through being surrounded by the two guiding elements and the guiding block.

Preferably, the positions of the two guiding elements and the guiding block are changeable on the detachable cover for being adapted to different sizes of the portable computer.

Preferably, the first engaging element is a hook structure.

Preferably, the second engaging element is a hook structure.

Preferably, the extending base further includes plural serial ports for being connected with plural computer peripheral equipments.

Preferably, the portable computer is one of a laptop and a tablet PC.

Preferably, the extending base is one of a docking station and a port replicator.

According to another aspect of the present invention, an extending base for a portable computer includes: a base body having an ejecting element mounted thereon, an electrical connector fixedly mounted on the base body for being electrically connected with the portable computer, a plurality of detachable covers, one of which is selected for covering the base body and supporting the portable computer, wherein each of the plurality of detachable covers is adapted to a different size of the portable computer, a plurality of first engaging elements mounted on the detachable cover, a sliding structure mounted on the base for sliding along the base in a parallel direction, a plurality of second engaging elements mounted on the sliding structure for engaging with the first engaging elements so as to fix the detachable cover on the base.

Preferably, each of the plurality of detachable covers further includes plural guiding elements mounted thereon at different positions according to the different size of the portable computer so as to fix the portable computer to a fixed position.

According to another aspect of the present invention, an extending base for a portable computer includes: a base body, an electrical connector fixedly mounted on the base body for being electrically connected with the portable computer, a detachable cover covering the base body for supporting the portable computer, wherein the electrical connector is protrudent out of the detachable cover, a first engaging element mounted on the detachable cover, a sliding structure mounted on the base body for sliding along a direction in response to an external force, a second engaging element mounted on the sliding structure for engaging with the first engaging element so as to fix the detachable cover on the base body.

The foregoing and other features and advantages of the present invention will be more clearly understood through the following descriptions with reference to the drawings, wherein:

DETAILED DESCRIPTION OF THE PREFERRED EMBODIMENT

Figure 1:
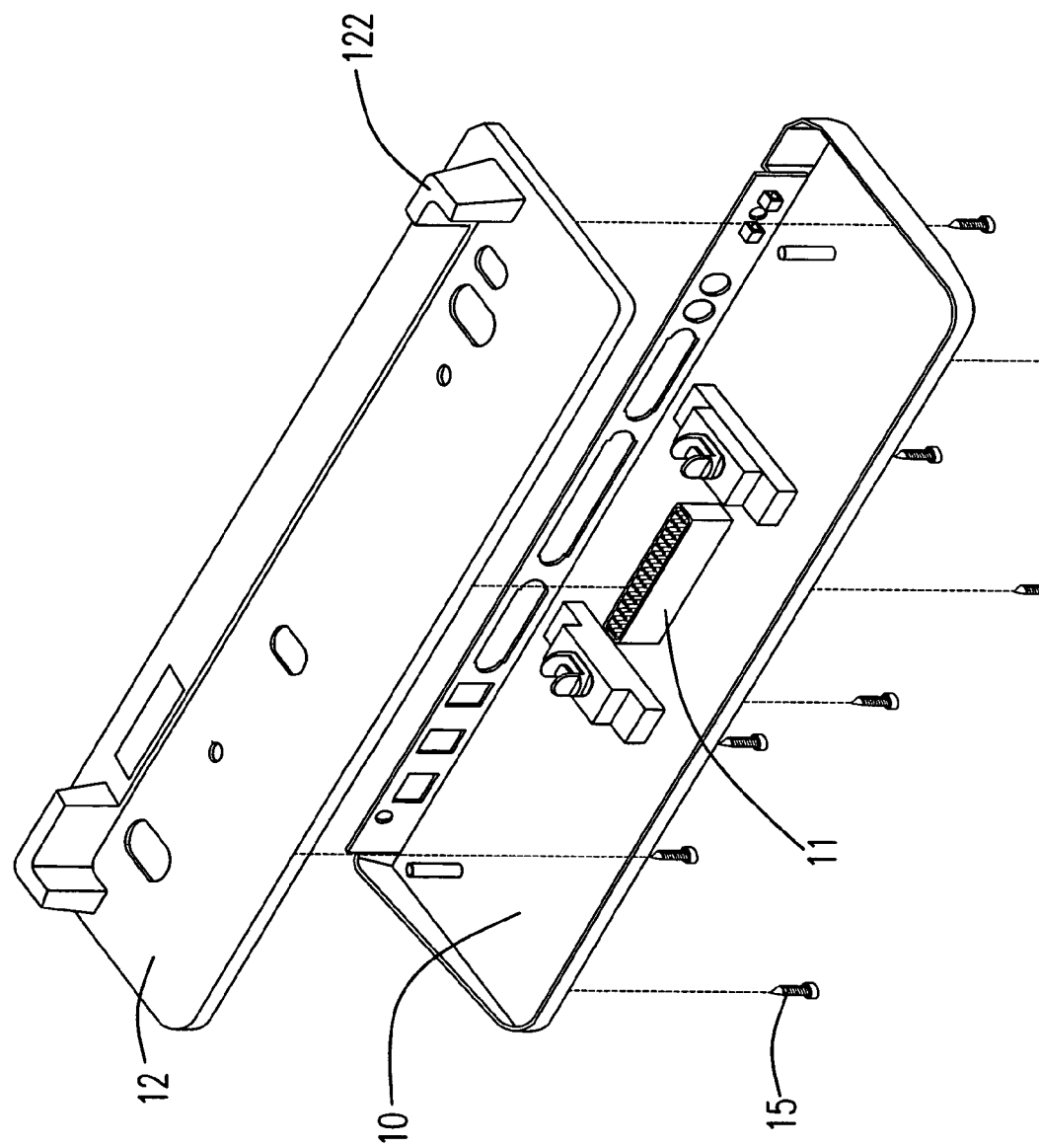
FIG. 1 is a diagram illustrating the traditional extending base according to the prior art.
Figure 2:
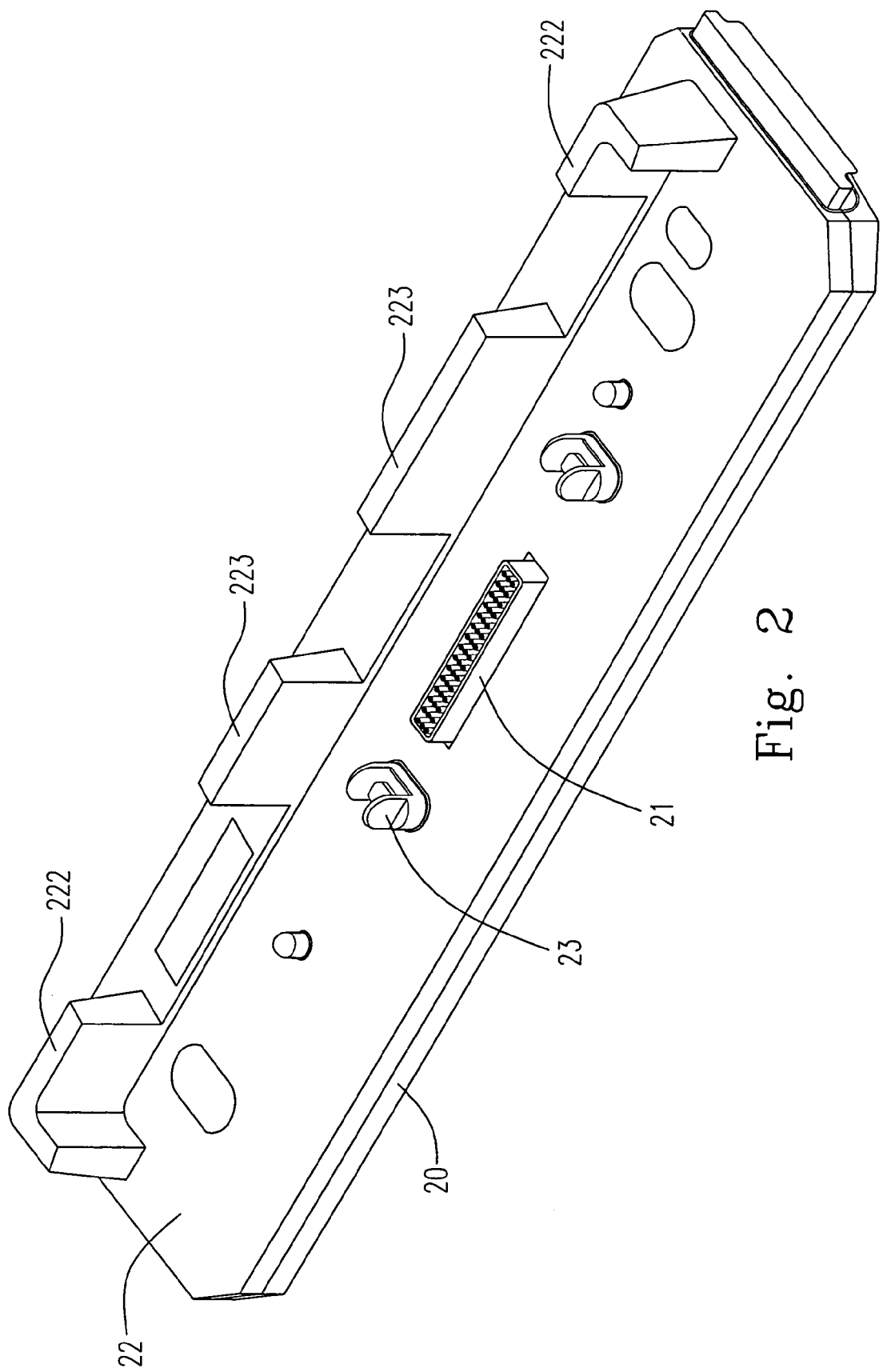
FIG. 2 is a diagram illustrating the outside appearance of the extending base according to a preferred embodiment of the present invention.

The present invention will now be described more specifically with reference to the following embodiments. Please refer to FIG. 2. FIG. 2 is a diagram illustrating the outside appearance of the extending base according to a preferred embodiment of the present invention. The extending base for a portable computer includes the base body 20, the electrical connector 21, and the detachable cover 22. The electrical connector 21 is fixedly mounted on the base body 20 for being electrically connected with the portable computer (not shown). The detachable cover 22 covers the base body 20 and supports the portable computer. Furthermore, the base body 20 includes the ejecting element 23 which is mounted on the base body 20. The position of the detachable cover 22 is corresponded to that of the electrical connector 21 and the ejecting element 23 so that the electrical connector 21 and the ejecting element 23 are protrudent out of the detachable cover 22. The protrudent electrical connector 21 is electrically connected with the electrical connector (not shown) of the portable computer. The electrical connector 21 is used for transmitting signals. Here the application principle for the electrical connector 21 is as same as the prior art, therefore it is not described repeatedly here. Nevertheless, the ejecting element 23 is connected with the elastic structure 231 (FIG. 4) for ejecting the portable computer out of the extending base by the elasticity of the elastic structure so as to separate the portable computer from the extending base.

Figure 3:
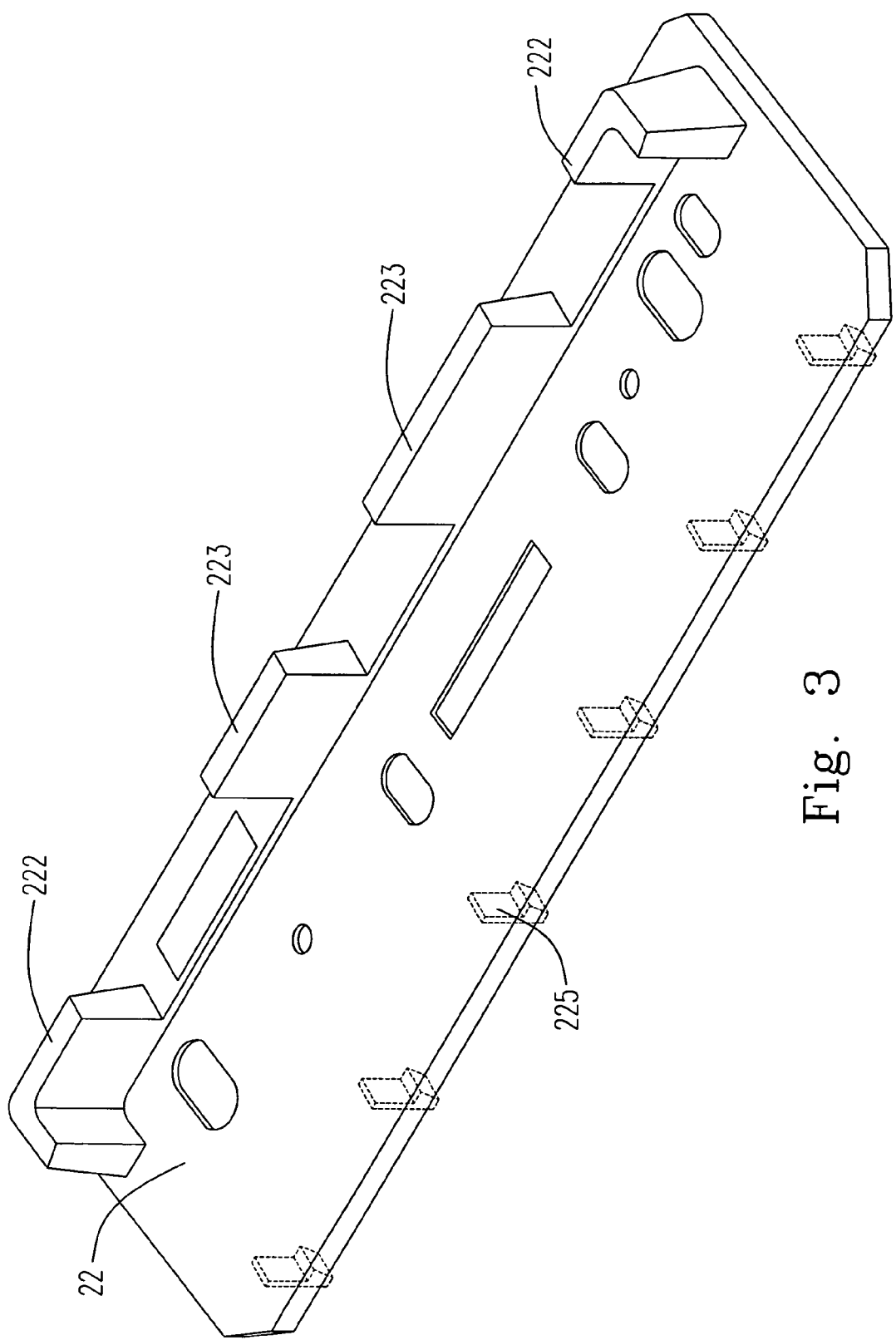
FIG. 3 is a diagram illustrating the internal structure of the detachable cover for the extending base according to a preferred embodiment of the present invention.
Figure 4:
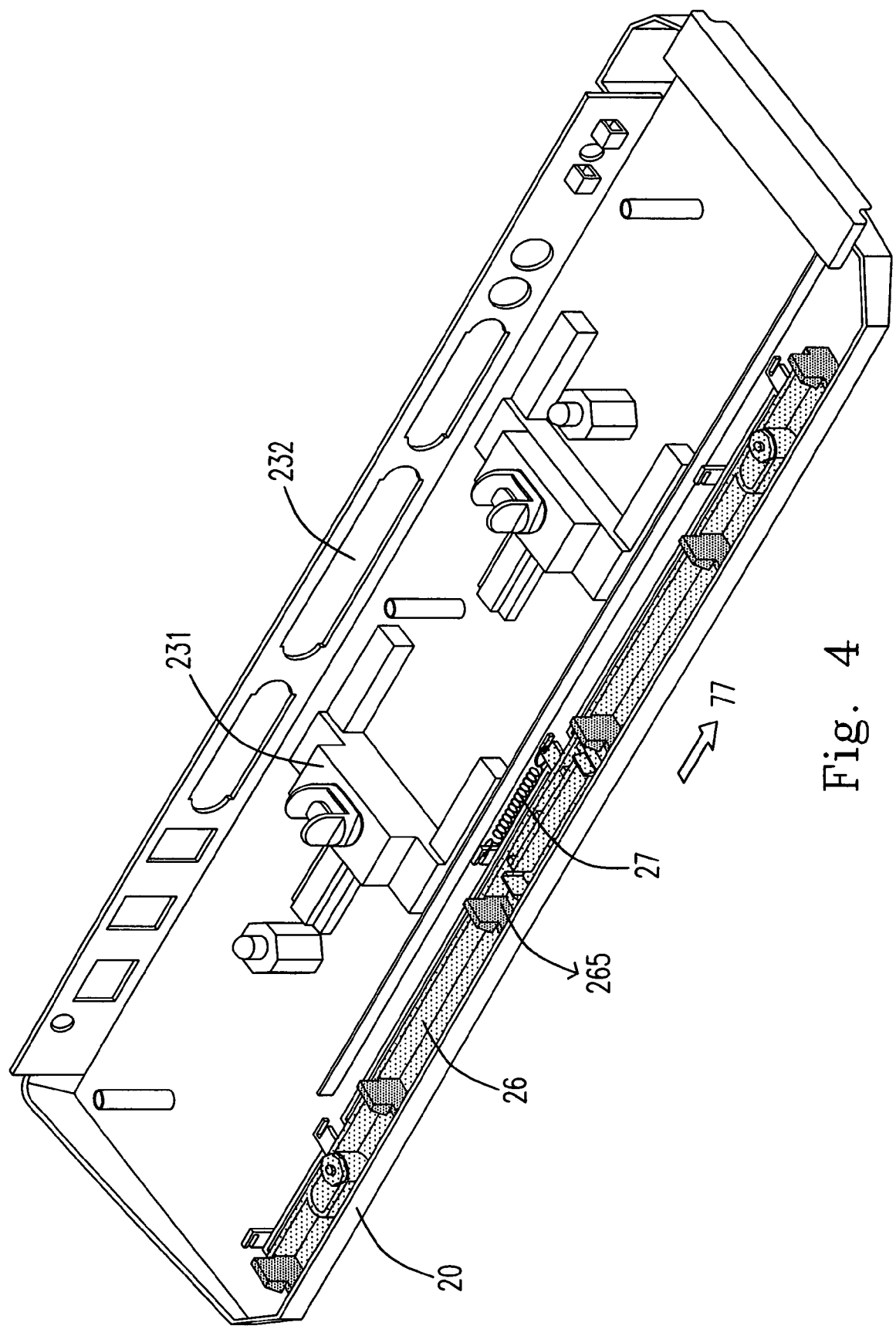
FIG. 4 is a diagram illustrating the internal structure of the base body for the extending base according to a preferred embodiment of the present invention.

The characteristic of the present invention is that the assembly of the detachable cover 22 and the base body 20 can be accomplished without any screws, which makes the assembly process simplified and convenient. Please refer to FIGS. 3 and 4. FIGS. 3 and 4 are diagrams illustrating the internal structure of the detachable cover and the base body according to a preferred embodiment of the present invention. There are a plurality of the first engaging elements 225 mounted on the downward side of the detachable cover 22. Inside the base body 20, there is the sliding structure 26 mounted thereon. When an external force is applied to the sliding structure 26, the sliding structure 26 will slide along the direction 77. There are a plurality of the second engaging elements 265 mounted on the sliding structure 26 for engaging with the first engaging elements 225. Through the engagement between the first engaging elements 225 and the second engaging elements 265, the detachable cover 22 is tightly fixed on the base body 20. Preferably, the sliding structure 26 and the second engaging elements 265 are formed integrally.

Figure 5:
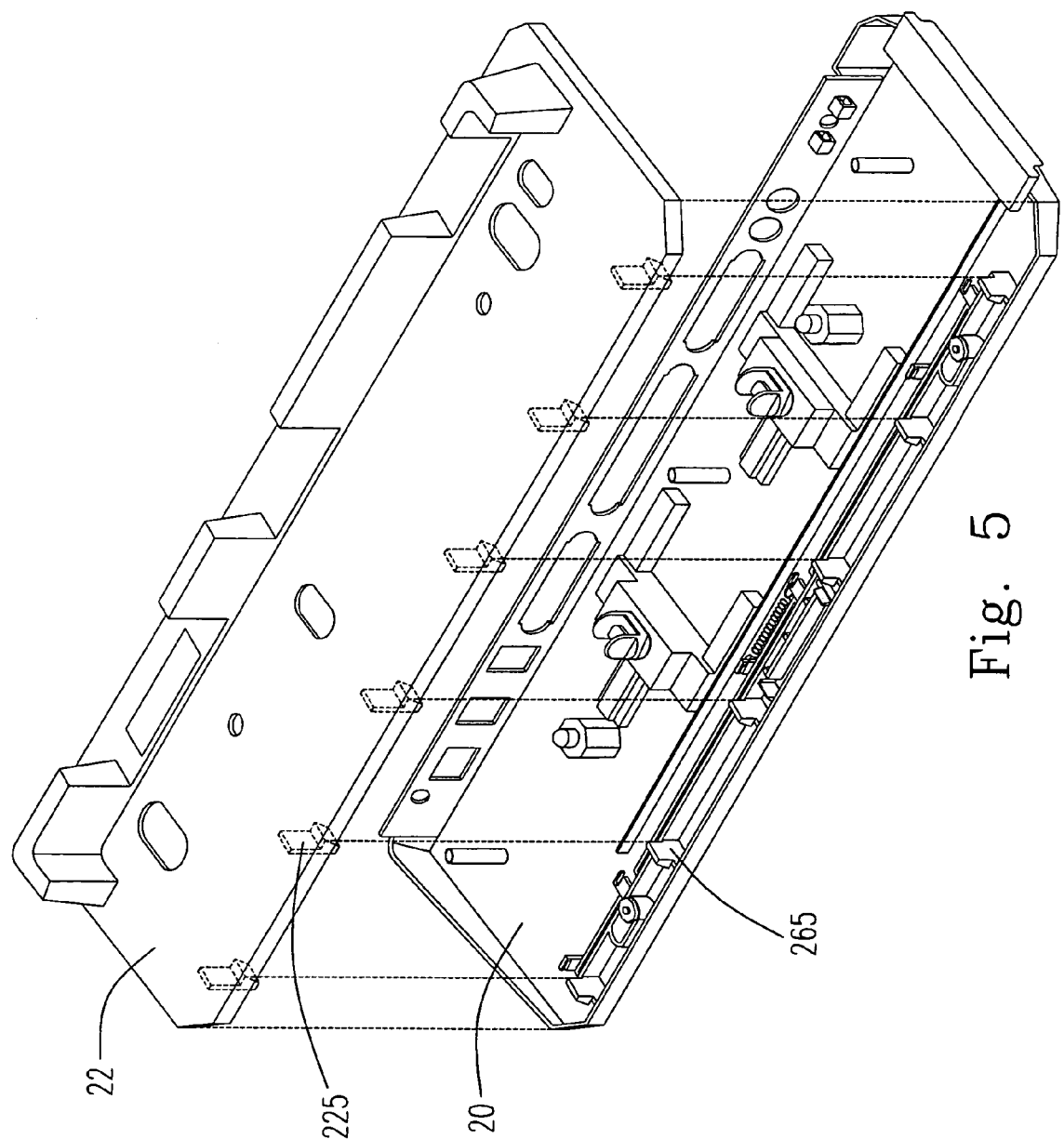
FIG. 5 is a diagram illustrating the assembly of the detachable cover and the base body for the extending base according to a preferred embodiment of the present invention.

Please refer to FIG. 5 which is a diagram illustrating the assembly of the detachable cover and the base body for the extending base according to a preferred embodiment of the present invention. The positions of the first engaging elements 225 and the second engaging elements 265 are corresponded to each other. For assembling, the detachable cover 22 is slightly pressed downwards to the base body 20 so the first engaging elements 225 are engaged with the second engaging elements 265. Preferably, the first engaging elements 225 and the second engaging elements 265 are hook structures. Therefore, the first engaging elements 225 and the second engaging elements 265 are mutually connected and engaged with each other by the corresponding shape, so as to fix the assembly structure of the detachable cover 22 and the base body 20. In such a way, the assembly for the extending base is accomplished by simply engaging the first engaging elements 225 and the second engaging elements 265, without any screws. Not only the time and the manpower for screwing the screws to the base body are spared, but also the cost for the screws is saved.

Figure 6:
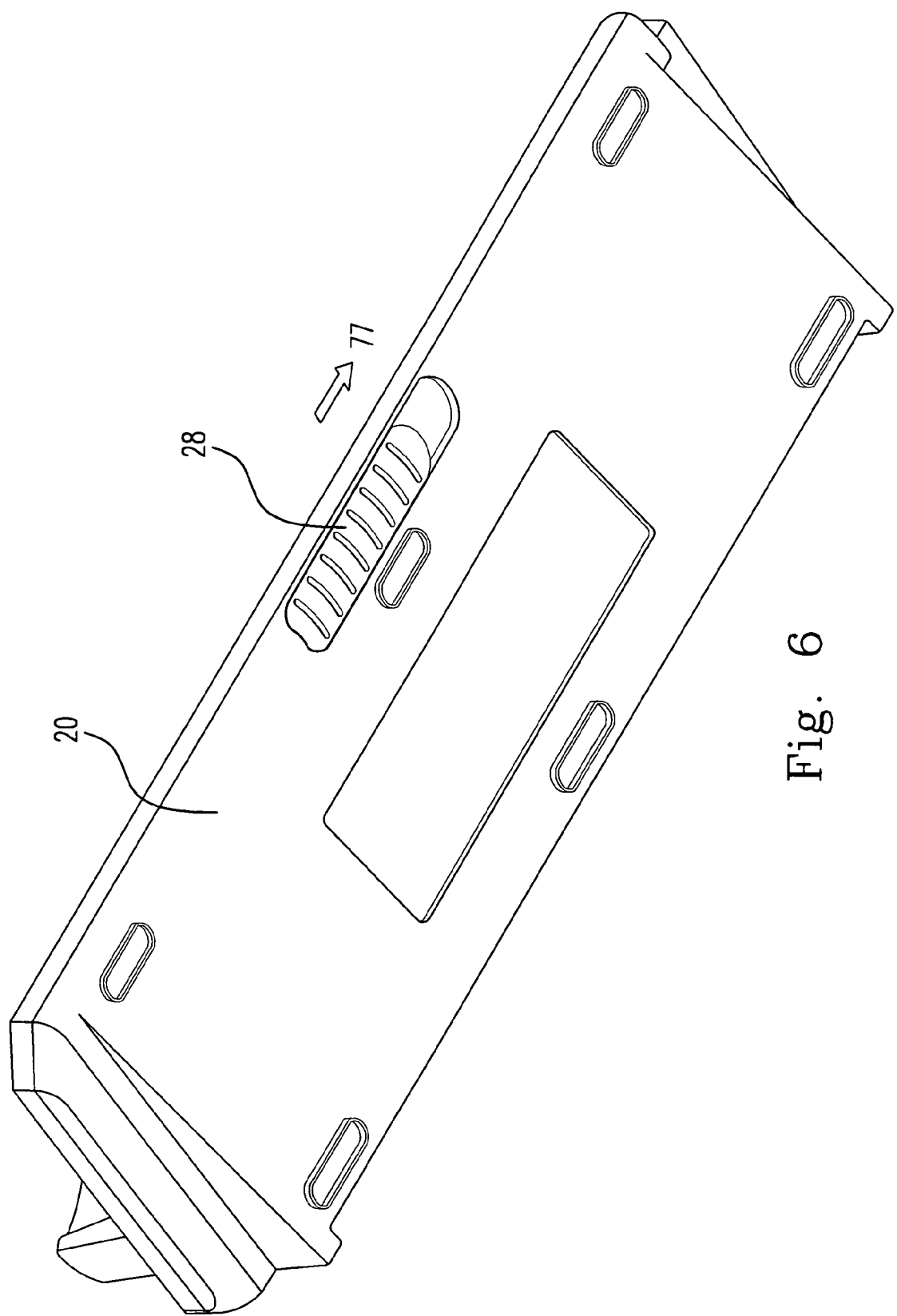
FIG. 6 is a bottom view of the extending base according to a preferred embodiment of the present invention.

Please refer to FIGS. 4, 5 and 6. FIG. 6 which is a bottom view of the extending base according to a preferred embodiment of the present invention. The extending base includes the latch 28 which is connected with the sliding structure 26 in FIG. 4 and protrudent out of the detachable cover 22 base body 20 for accepting the external force. When the external force is applied to the latch 28, the sliding structure 26 will slide along the direction 77. As shown in FIG. 4, the sliding structure 26 is connected with the elastic element 27 mounted on the base body 20. After the external force disappears, the sliding structure 26 will automatically slide back to a recovery position by the elasticity of the elastic element 27. In addition, since the sliding structure 26 and the second engaging elements 265 are formed integrally, the second engaging elements 265 will slide along the direction 77 together with the sliding structure 26. Therefore, the first engaging elements 225 and the second engaging elements 265 are disengaged from each other when the external force which impels the sliding structure 26 to slide along the direction 77 is applied to the latch 28, so that the detachable cover 22 is detached from the base body 20. In other words, by applying an external force to the latch 28, the user can easily detach the detachable cover 22 and open the extending base for changing another detachable cover 22 or further repairing. When the user wants to cover the detachable cover 22 back on the base body 20, the assembly can be accomplished by simple engaging step. Hence, the user can rapidly detach and replace the detachable cover 22 without using the screwdriver and screws, which greatly spares the time and strength for the user.

In addition, the extending base provided in the present invention may have plural detachable covers 22 for the base body 20 so as to allow the extending base to be adapted to different sizes of the portable computers. In other words, when the user uses different laptops, he only needs to replace the detachable cover 22 according to the size of the portable computer, instead of replacing another extending base. The detachable cover 22 further includes two guiding elements 222a and 222b for guiding the portable computer to a fixed position, as shown in FIG. 3. The two guiding elements 222a and 222b are respectively mounted at two upper corners of the detachable cover 22. According to a preferred embodiment, the detachable cover 22 further includes the guiding block 223 which is mounted at the upside of the detachable covers 22 for further guiding the portable computer to the fixed position. Thus, the portable computer is guided to the fixed position through being surrounded by the two guiding elements 222*a* and 222*b* and the guiding block 223. When connecting the portable computer with the extending base, the user can move the portable computer according to the positions of the guiding element 222*b* and the guiding block 223 in order to place the portable computer at the correct fixed position. After the portable computer is placed at the fixed position, the electrical connection between the electrical connector 21 of the extending base and the electrical connector of the portable computer can be made. According to the preferred embodiment, the extending base may have plural detachable covers 22, and each of the detachable covers 22 would have guiding elements 222*b* and guiding block 223 mounted on different positions because of different sizes of different laptops. The positions of the guiding elements 222*b* and the guiding block 223 are decided according to the standards of the portable computers for providing a better guiding function. Hence, the user can simply replace the detachable cover 22 which is adapted to the certain computer of the user, instead of replacing the whole extending base.

Figure 7:
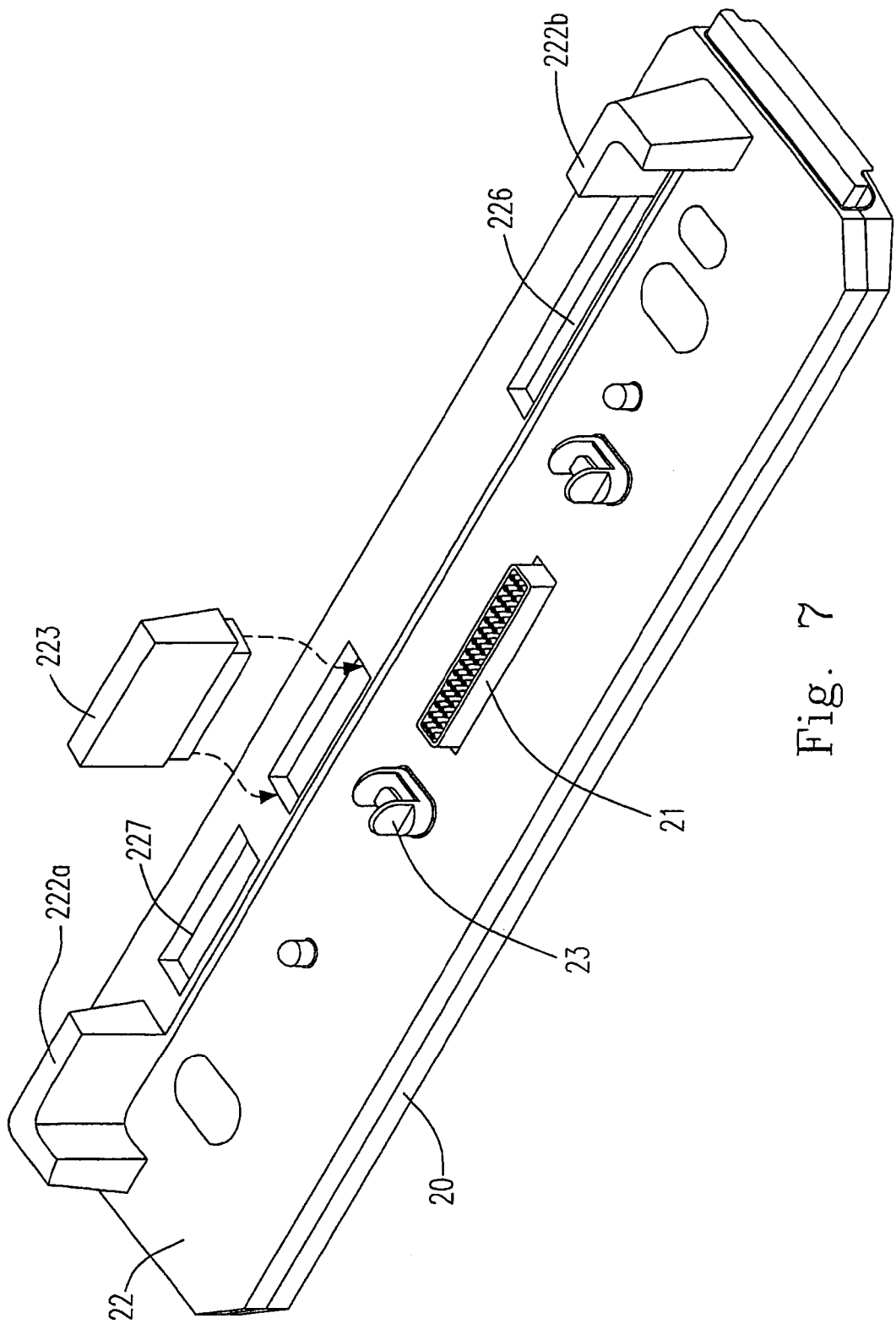
FIG. 7 is a diagram illustrating the detachable cover for the extending base according to another preferred embodiment of the present invention.

Please refer to FIG. 7 which is a diagram illustrating the detachable cover for the extending base according to another preferred embodiment of the present invention. According to another preferred embodiment, the positions of guiding elements element 222*b* and the guiding block 223 mounted on the detachable cover 22 are removable on the detachable cover 22 for being adapted to different sizes of the portable computer. Element 222*b* is removable, but in the embodiment shown in FIG. 7. element 222*a* is fixed to or molded as a part of the base body 22. As shown, the guiding element 222*b* is positioned on a slot 226, and there is a hollow 227 near to the guiding block 223. Therefore, the positions of the guiding element 222*b* and the guiding block 223 are removable when the guiding element 222*b* is moved on the slot 226 and the guiding block 223 is moved on the hollow 227. Therefore, when the user uses different portable computers, he can directly move the guiding element 222*b* and the guiding block 223 to a proper position for guiding the computer to a fixed position. In this embodiment, there is no need to replace the detachable cover 22 either. Nevertheless, according to a preferred embodiment, the extending base of the present invention further includes plural serial ports 232 (as shown in FIG. 4) for being connected with plural computer peripheral equipments.

According to the above, the drawbacks in the conventional extending base are not existed in the extending base provided in the present invention. First, the extending base is assembled by an easier and convenient process without the need of screwdriver and screws, which saves the time and the manpower. Furthermore, the extending base has the flexibility of changing the upper cover for the base body so that it can be adapted to different standards and sizes of the portable computer. The user would not have to replace the whole extending base for different laptop anymore. In addition, through the design of the engaging elements and the sliding structure, the detachable cover can be replaced simply by pushing the latch and then applied to the portable computer with different sizes. Hence, the present invention not only has a novelty and a progressive nature, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An extending base for a portable computer, comprising:
 a base body;
 an electrical connector fixedly mounted on said base body for being electrically connected with said portable computer;
 a detachable cover covering said base body for supporting said portable computer, wherein said electrical connector is protrudent out of said detachable cover;
 a plurality of first engaging elements mounted on said detachable cover;
 a sliding structure mounted on said base body for sliding along a direction in response to an external force;
 a latch connected with said sliding structure and protrudent out of said base body for accepting said external force; and
 a plurality of second engaging elements mounted on said sliding structure for engaging with said first engaging elements so as to fix said detachable cover on said base body,
 wherein when said latch accepts said external force which impels said sliding structure to slide along said direction, said first engaging elements and said second engaging elements are disengaged from each other so as to detach said detachable cover from said base body.

2. The extending base according to claim 1, wherein said sliding structure is connected with an elastic element mounted on said base body so as to automatically slide back to a recovery position by an elasticity of said elastic element after said external force disappears.

3. The extending base according to claim 1, wherein said detachable cover further comprises two guiding elements respectively mounted at two upper corners of said detachable cover for guiding said portable computer to a fixed position.

4. The extending base according to claim 3, wherein said detachable cover further comprises a guiding block mounted at an upside of said detachable cover for further guiding said portable computer to said fixed position.

5. The extending base according to claim 4, wherein said two guiding elements and said guiding block guide are adapted to guide the portable computer and fix the portable computer on said detachable cover.

6. The extending base according to claim 5, wherein positions of said two guiding elements and said guiding block are changeable on said detachable cover for being adapted to different sizes of said portable computer.

7. The extending base according to claim 1, wherein said first engaging element is a hook structure.

8. The extending base according to claim 1, wherein said second engaging element is a hook structure.

9. The extending base according to claim 1 further comprising plural serial ports for being connected with plural computer peripheral equipments.

10. An extending base for a portable computer, comprising:
 a base body having an ejecting element mounted thereon;
 an electrical connector fixedly mounted on said base body for being electrically connected with said portable computer;
 a plurality of detachable covers, one of which is selected for covering said base body and supporting said portable computer, wherein each of said plurality of detachable covers is adapted to a different size of said portable computer;
a plurality of first engaging elements mounted on said detachable cover;
a sliding structure mounted on said base for sliding along said base in a parallel direction; and
a plurality of second engaging elements mounted on said sliding structure for engaging with said first engaging elements so as to fix said detachable cover on said base.

11. The extending base according to claim 10, wherein said each of said plurality of detachable covers further comprises plural guiding elements mounted thereon at different positions according to said different size of said portable computer so as to fix said portable computer to a fixed position.

12. An extending base for a portable computer, comprising:
a base body;
an electrical connector fixedly mounted on said base body for being electrically connected with said portable computer;
a detachable cover covering said base body for supporting said portable computer, wherein said electrical connector is protrudent out of said detachable cover;
a first engaging element mounted on said detachable cover;
a sliding structure mounted on said base body for sliding along a direction in response to an external force;
a latch connected with said sliding structure and protrudent out of said base body for accepting said external force; and
a second engaging element mounted on said sliding structure for engaging with said first engaging element so as to fix said detachable cover on said base body, wherein when said latch accepts said external force which impels said sliding structure to slide along said direction, said first engaging element and said second engaging element are disengaged from each other so as to detach said detachable cover from said base body.

13. An extending base for a portable computer, comprising:
a base body;
an electrical connector fixedly mounted on said base body for being electrically connected with said portable computer;
a detachable cover covering said base body for supporting said portable computer, wherein said electrical connector is protrudent out of said detachable cover;
a plurality of first engaging elements mounted on said detachable cover; a sliding structure mounted on said base body for sliding along a direction in response to an external force; and
a plurality of second engaging elements mounted on said sliding structure for engaging with said first engaging elements so as to fix said detachable cover on said base body, wherein said sliding structure is connected with an elastic element mounted on said base body so as to automatically slide back to a recovery position by an elasticity of said elastic element after said external force disappears.

14. An extending base for a portable computer, comprising:
a base body;
an electrical connector fixedly mounted on said base body for being electrically connected with said portable computer;
a detachable cover covering said base body for supporting said portable computer, wherein said electrical connector is protrudent out of said detachable cover;
a plurality of first engaging elements mounted on said detachable cover; a sliding structure mounted on said base body for sliding along a direction in response to an external force; and
a plurality of second engaging elements mounted on said sliding structure for engaging with said first engaging elements so as to fix said detachable cover on said base body, wherein said detachable cover comprises two guiding elements respectively mounted at two upper corners of said detachable cover for guiding the portable computer to a fixed position.

15. The extending base according to claim 14, wherein said detachable cover further comprises a guiding block mounted at an upside of said detachable cover for further guiding the portable computer to the fixed position.

16. An extending base for a portable computer, comprising:
a base body;
an electrical connector fixedly mounted on said base body for being electrically connected with said portable computer;
a detachable cover covering said base body for supporting said portable computer, wherein said electrical connector is protrudent out of said detachable cover;
a plurality of first engaging elements mounted on said detachable cover; a sliding structure mounted on said base body for sliding along a direction in response to an external force; and
a plurality of second engaging elements mounted on said sliding structure for engaging with said first engaging elements so as to fix said detachable cover on said base body; and
plural serial ports for being connected with plural computer peripheral equipment.

* * * * *